US012494564B2

(12) United States Patent
Zhang et al.

(10) Patent No.: US 12,494,564 B2
(45) Date of Patent: Dec. 9, 2025

(54) RADIO FREQUENCY CHIP, SIGNAL TRANSCEIVER, AND COMMUNICATION DEVICE

(71) Applicant: HUAWEI TECHNOLOGIES CO., LTD., Shenzhen (CN)

(72) Inventors: Luqi Zhang, Shenzhen (CN); Kun Li, Chengdu (CN); Xianfeng Tang, Shenzhen (CN); Yanxing Luo, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 457 days.

(21) Appl. No.: 18/180,085

(22) Filed: Mar. 7, 2023

(65) Prior Publication Data

US 2023/0318166 A1 Oct. 5, 2023

Related U.S. Application Data

(63) Continuation of application No. PCT/CN2021/093770, filed on May 14, 2021.

(30) Foreign Application Priority Data

Sep. 16, 2020 (CN) ......................... 202010975335.0

(51) Int. Cl.
*H01Q 1/22* (2006.01)
*H01Q 1/38* (2006.01)
*H01Q 1/50* (2006.01)
*H01Q 9/04* (2006.01)

(52) U.S. Cl.
CPC ............. *H01Q 1/2283* (2013.01); *H01Q 1/38* (2013.01); *H01Q 1/50* (2013.01); *H01Q 9/0407* (2013.01)

(58) Field of Classification Search
CPC .......... H01Q 1/2283; H01Q 1/38; H01Q 9/04; H01Q 21/0025; H01Q 23/00; H01L 23/66; H01L 2223/6677
See application file for complete search history.

(56) References Cited

U.S. PATENT DOCUMENTS

| | | | | |
|---|---|---|---|---|
| 10,608,319 B2 * | 3/2020 | Kim | ........................ | H01L 25/18 |
| 11,075,453 B1 * | 7/2021 | Bulumulla | ............. | H01Q 1/422 |
| 11,128,029 B2 * | 9/2021 | Nair | ........................ | H01L 23/66 |
| 2010/0193935 A1 | 8/2010 | Lachner et al. | | |

FOREIGN PATENT DOCUMENTS

CN 107942451 A 4/2018

* cited by examiner

*Primary Examiner* — Hasan Islam

(57) ABSTRACT

This disclosure provides a radio frequency chip, a signal transceiver, and a communication device. The radio frequency chip includes: a chip; a coupling structure, including: a resonator, where a resonant cavity is formed, and an inner wall of the resonant cavity is made of metal; a redistribution layer, arranged above the resonant cavity and including an redistribution layer (RDL) dielectric layer; a radiator, made of metal, formed into a centro-symmetric shape, arranged on a surface that is of the dielectric layer and that faces the resonator, and accommodated in the resonant cavity; a feeder, where one end of the feeder is connected to the chip, and the other end is inserted into the resonant cavity; a packaging structure, configured to package the chip and cover the redistribution layer, so that a signal generated by the chip can be efficiently coupled to a polymer transmission line.

20 Claims, 13 Drawing Sheets

RADIO FREQUENCY CHIP, SIGNAL TRANSCEIVER, AND COMMUNICATION DEVICE

CROSS-REFERENCE TO RELATED APPLICATIONS

This is a continuation of International Application No. PCT/CN2021/093770, filed on May 14, 2021, which claims priority to Chinese Patent Application No. 202010975335.0, filed on Sep. 16, 2020. The disclosures of the aforementioned applications are hereby incorporated by reference in their entireties.

TECHNICAL FIELD

Embodiments of this disclosure relate to the communication field, and more specifically, to a radio frequency chip, a signal transceiver, and a communication device.

BACKGROUND

With development of information technologies, a requirement for a transmission rate between devices is increasingly high. For example, a large quantity of high-speed cables need to be arranged between cabinets and inside cabinets in a data center to implement high-speed data transmission. Currently, high-speed cables mainly include active optical cables and direct attach copper cables. When an active optical cable is used, an electrical signal needs to be converted into an optical signal, or an optical signal needs to be converted into an electrical signal; and optical transceivers at two ends of the active optical cable need to provide optical-to-electrical conversion and optical transmission functions, resulting in high power consumption and high costs. When a direct attach copper cable is used, no electrical-to-optical or optical-to-electrical conversion process needs to be performed, and an electrical signal is directly transmitted. Therefore, power consumption and costs are low. However, as an operating frequency increases, a metal loss of the direct attach copper cable increases, which limits a transmission distance and rate of the direct attach copper cable. In addition, the copper cable has a large weight and bending radius, which is not conducive to application in a dense cabling scenario.

In view of this, a terahertz active cable technology is provided, that is, a terahertz wave is used as a carrier and a polymer transmission line is used as a transmission medium. Compared with direct attach copper cables and optical fibers, polymer transmission lines have advantages of low loss, light weight, and low costs.

However, how to couple a terahertz signal (or a terahertz modulation signal) output by a chip to the polymer transmission line is a key problem.

SUMMARY

This disclosure provides a radio frequency chip, a signal transceiver, and a communication device, so that a coupling structure used to couple a signal to a polymer transmission cable can be integrated into a chip, thereby improving coupling efficiency.

According to a first aspect, a radio frequency chip is provided, including: a chip 200, configured to generate an electromagnetic signal or process an electromagnetic signal; a coupling structure 100, including: a resonator 110, where a resonant cavity 112 and a groove 114 are formed, an inner wall of the resonant cavity 112 is made of metal, one end of the resonant cavity 112 is opened on a top surface 1102 of the resonator 110, the other end of the resonant cavity 112 is sealed by using a metal material, a cross section of the resonant cavity 112 is formed into a centro-symmetric shape, and the groove 114 connects an outer wall of the resonator 110 and an inner wall of the resonant cavity 112; a redistribution layer (RDL) 120, arranged above the top surface 1102 and including an RDL dielectric layer 124; a radiator 130, made of metal, formed into a centro-symmetric shape, arranged on a surface that is of the RDL dielectric layer 124 and that faces the resonator 110, and accommodated in the resonant cavity 112; a feeder 140, accommodated in a groove 114, where one end is connected to the chip 200, and the other end is inserted into the resonant cavity 112; and a packaging structure 300, configured to package the chip 200 and cover the redistribution layer RDL 120, where a through hole 310 for accommodating a metal connector is formed on the packaging structure 300, one end of the metal connector is in contact with a surface that is of the RDL 120 and that faces away from the resonator 110, the other end of the metal connector is configured to connect to a polymer transmission cable, and a cross section of the through hole 310 is formed into a centro-symmetric shape; a symmetry center of the radiator 130, a symmetry center of the resonant cavity 112, and a symmetry center of the through hole 310 are coaxially arranged, and a deviation between cross-sectional sizes of the through hole 310 and the resonant cavity 112 is within a first preset range.

According to the solution provided in this disclosure, a centro-symmetric radiator is designed at the redistribution layer of the chip, and a through hole for embedding the metal connector is arranged on the packaging structure of the chip, so that a signal generated by the chip can be efficiently coupled to the polymer transmission line. Because the foregoing structure is packaged in the chip, an insertion loss generated due to a connection line arranged between the chip and the coupling structure can be reduced, thereby improving coupling efficiency; and integration between the chip and the coupling structure can be improved, thereby facilitating large-scale processing.

The electromagnetic signal includes a terahertz (Tera Hertz, THz) signal, or may also be referred to as a THz modulation signal.

"a radiator 130, formed into a centro-symmetric shape" may be understood as that the radiator 130 includes a plurality of resonant arms, and the plurality of resonant arms are centro-symmetrically arranged.

Central symmetry (central symmetry) means that if a figure can coincide with another figure after being rotated 180° around a point, the two figures are considered to be symmetric or centro-symmetric with respect to the point.

In this disclosure, the groove 114 may be arranged on one side wall of the resonator 110, and the groove 114 may penetrate a part or all of the side wall in a height direction. This is not particularly limited in this disclosure.

In this disclosure, the redistribution layer (RDL) 120 may further include an RDL bottom metal layer and an RDL top metal layer; and an RDL dielectric layer 124 is located between the RDL bottom metal layer and the RDL top metal layer.

In addition, for the RDL bottom metal layer 122 and the RDL top metal layer 126, the RDL bottom metal layer 122 is arranged on the top surface 1102 of the resonator 110, and a hole 1221 is arranged at the RDL bottom metal layer 122. A size of the hole 1221 is corresponding to a cross-sectional size of the resonant cavity 112, a hole 1226 is arranged at the RDL top metal layer 126, and a size of the hole 1226 is corresponding to a cross-sectional size of the resonant cavity 112. A symmetry center of the hole 1226, a symmetry center of the hole 1221, the symmetry center of the radiator 130, the symmetry center of the resonant cavity 112, and the symmetry center of the through hole 310 are coaxially arranged.

In this disclosure, a deviation between a depth of the resonant cavity 112 and a first value is within a second preset range, and the first value is a quarter of a wavelength of the electromagnetic signal.

In this disclosure, the feeder 140 is inserted into the resonant cavity 112 in a first direction, and a length L1 of the first part of the resonant cavity 112 in which the feeder 140 is inserted is determined based on a length L2 of the radiator 130 in the first direction and a length L3 of the resonant cavity 112 in the first direction.

Alternatively, L2 is determined based on L1 and L3.

Alternatively, L3 is determined based on L1 and L2.

The length L1, the length L2, and the length L3 meet the following relationship: $L1+0.5\times L2<0.5\times L3$.

In an implementation, the resonator 110 is made of a waveguide material.

In this case, a metal covering layer is arranged on the inner wall of the resonant cavity.

In this disclosure, an operating frequency f of the waveguide material is corresponding to a cross-sectional diameter D1 of the metal connector.

For example, the operating frequency f and the cross-sectional diameter D1 meet the following relationship: $f\geq 1.841c/2\times\pi\times D1$, where c represents the speed of light.

In this disclosure, the depth of the resonant cavity 112 is greater than or equal to a sum of a second value and a third value, where the second value is a depth of a recessed structure that is in a printed circuit board (Printed Circuit Board, PCB) and that is configured to accommodate the coupling structure 100, and the second value is a height of a solder ball in the PCB.

In an implementation, a cross section of the resonant cavity 112 and a cross section of the metal connector are circular, and a deviation between a diameter of the resonant cavity and the diameter of the metal connector is within a third preset range.

By way of example and not limitation, the radiator 130 is formed into one of a cross structure, a double-X-shaped structure, an X-shaped structure, a rectangular ring shaped structure, or a 2×2 grid structure.

In an implementation, the resonant cavity 112 is specifically a semi-through hole formed on the resonator 110, where a metal covering layer is arranged on an inner wall and a bottom surface of the semi-through hole.

In another implementation, the resonant cavity 112 is specifically a through hole formed on the resonator 110.

In this case, a metal plate is arranged on a bottom surface of the resonator 110, and the metal plate seals an opening that is of the through hole and that is located on the bottom surface.

Alternatively, a metal plate is arranged on a PCB configured to arrange the radio frequency chip, and the metal plate is configured to seal an opening that is of the through hole and that is located on the bottom surface.

According to a second aspect, a signal transceiver is provided, including: the radio frequency chip according to any one of the first aspect or the possible implementations of the first aspect; and a printed circuit board PCB, configured to arrange the radio frequency chip.

In an implementation, a recessed structure is arranged on the PCB, and is configured to accommodate the radio frequency chip, where the recessed structure is a through hole; or the recessed structure is a groove.

In another implementation, the signal transceiver further includes the metal connector.

In still another implementation, the signal transceiver further includes the polymer transmission cable.

According to a third aspect, a communication device is provided, including the signal transceiver according to any one of the second aspect or the possible implementations of the second aspect.

According to a fourth aspect, a communication cable is provided, including a polymer transmission cable; the radio frequency chip according to any one of the first aspect or the possible implementations of the first aspect; a metal connector, accommodated in the through hole 310 of the packaging structure 300 of the radio frequency chip, where one end of the metal connector is in contact with a surface that is of the RDL 120 and that faces away from the resonator 110, and the other end of the metal connector is configured to connect to a polymer transmission cable.

According to a fifth aspect, a server is provided, where each server includes at least one signal transceiver according to any one of the second aspect or the possible implementations of the second aspect.

According to a sixth aspect, a data processing system is provided, including a plurality of servers, where each server includes at least one signal transceiver according to any one of the second aspect or the possible implementations of the second aspect.

DESCRIPTION OF EMBODIMENTS

The following describes technical solutions of this disclosure with reference to accompanying drawings.

Figure 1:
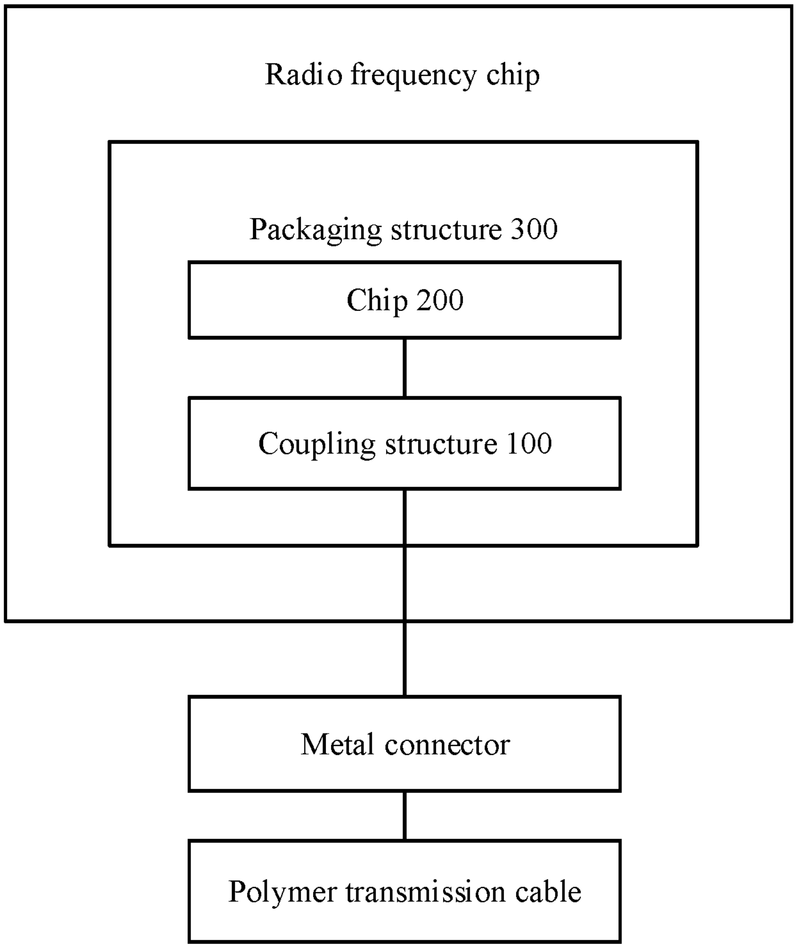
FIG. 1 is a schematic diagram of a structure of an example of a radio frequency chip according to this disclosure.

FIG. 1 is a schematic diagram of a structure of an example of a radio frequency chip according to this disclosure. As shown in FIG. 1, the radio frequency chip according to this disclosure includes a chip 200, a coupling structure 100, and a packaging structure 300.

The chip 200 is configured to generate an electromagnetic signal that needs to be sent to the outside, and/or the chip 200 is configured to process an electromagnetic signal from the outside.

By way of example and not limitation, the electromagnetic signal may include, but is not limited to, a terahertz (Tera Hertz, THz) signal.

The THz signal may also be referred to as a THz modulation signal, and is a signal carried on a terahertz wave.

A terahertz wave is an electromagnetic wave with a frequency in the range of 0.1-10 THz (wavelength 3000-30 μm), which coincides with a millimeter wave on a long wavelength band and coincides with infrared light on a short wavelength band. The terahertz wave is a transition region from a macroscopic classical theory to a microscopic quantum theory, and is also a transition region from electronics to photonics, and is referred to as a THz gap of the electromagnetic spectrum.

Processes of generating and processing an electromagnetic signal by the chip 200 may be similar to those in a conventional technology. To avoid repetition, detailed descriptions are omitted herein.

The coupling structure 100 is configured to couple an electromagnetic signal generated by the chip 200 to a metal connector, and then transmit the electromagnetic signal to an external device through a polymer transmission cable connected to the metal connector.

In addition, the coupling structure 100 is configured to couple an electromagnetic signal that is input from an external device to the chip 200 through the polymer transmission cable and the metal connector.

The polymer transmission cable is of a solid-core structure, and a material includes, but is not limited to, polytetrafluoroethylene. In addition, ends of the polymer transmission cable are formed into a tapered gradient structure, so as to be inserted into the metal connector.

In addition, to ensure alignment between the polymer transmission cable and the metal connector, the polymer transmission cable and the metal connector are coaxially arranged, and a diameter Od of the polymer transmission cable and a diameter Cd of the metal connector meet the following relationship: Cd≤Od It should be understood that the foregoing listed connection relationship between the metal connector and the polymer transmission line is merely an example for description, and this disclosure is not limited thereto. In addition, structures and materials of the metal connector and the polymer transmission line may also be similar to those in the conventional technology. This is not particularly limited in this disclosure.

The packaging structure 300 is configured to package the chip 200 and the coupling structure 100, to form an integrated radio frequency chip.

Specifically, the packaging structure 300 covers the redistribution layer RDL 120 of the coupling structure 100 (the component is subsequently described in detail), and a through hole 310 for accommodating the metal connector is formed on the packaging structure 300, where a shape of the through hole 310 is corresponding to a shape of the metal connector. For example, the through hole 310 (specifically, a cross section of the through hole 310) is formed as a circle. In addition, a symmetry center of the through hole 310 and a symmetry center of the metal connector are coaxially arranged. That is, an axis of the through hole 310 and an axis of the metal connector are coaxially arranged. In addition, a size of the through hole 310 is corresponding to a size of the metal connector. For example, a diameter of the through hole 310 is the same as or approximately the same as a diameter of the metal connector.

The following describes in detail a structure and an arrangement of the coupling structure 100 in this disclosure.

Figure 2:
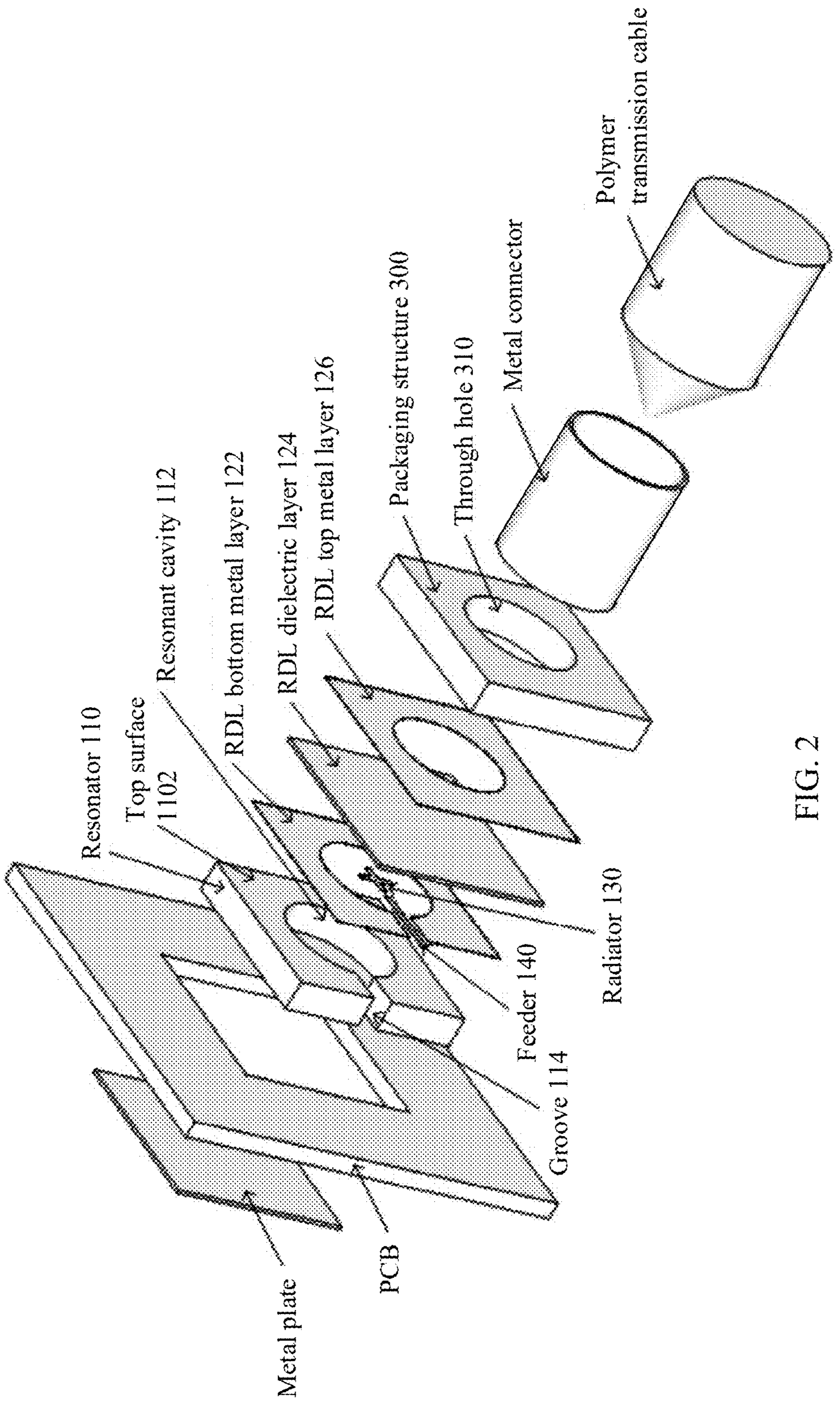
FIG. 2 is a three-dimensional exploded view of a radio frequency chip according to this disclosure.

FIG. 2 is a three-dimensional exploded view of a radio frequency chip according to this disclosure. As shown in FIG. 2, a coupling structure 100 includes a resonator 110, a redistribution layer (RDL) 120, a radiator 130, and a feeder 140.

The following separately describes in detail structures and arrangements of the foregoing components.

A. Resonator 110

As shown in FIG. 2 to FIG. 5, a resonant cavity 112 and a groove 114 are formed on the resonator 110.

A shape of the resonant cavity 112 is a centro-symmetric shape.

In addition, a shape of the resonant cavity 112 is corresponding to a shape of the metal connector.

For example, the resonant cavity 112 (specifically, a cross section of the resonant cavity 112) is formed as a circle.

In addition, a symmetry center of the resonant cavity 112 and a symmetry center of the metal connector are coaxially arranged.

That is, an axis of the resonant cavity 112 and an axis of the metal connector are coaxially arranged.

In addition, a size of the resonant cavity 112 is corresponding to a size of the metal connector.

In this disclosure, a side wall of the resonant cavity 112 is covered with a metal material (for example, in a manner of electroplating, vapor deposition, or sputtering).

The side wall of the resonant cavity 112 may also be referred to as an inner wall of the resonant cavity 112 or an inner wall of the resonator 110.

In this disclosure, the resonant cavity 112 includes an open end and a closed end, and the closed end is closed (or sealed or covered) by using a metal material.

The open end of the resonant cavity 112 is arranged on the top surface 1102 of the resonator 110, that is, the resonant cavity 112 is opened on the top surface 1102 of the resonator 110.

Figure 4:
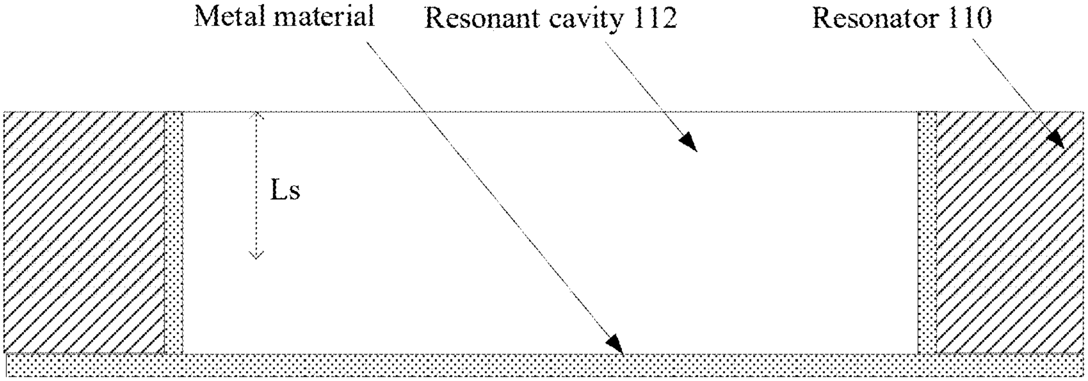
FIG. 4 is a schematic diagram of an example of a resonator according to this disclosure.

FIG. 4 is a schematic sectional view of an example of a structure of the resonator 110 according to this disclosure. As shown in FIG. 2 and FIG. 4, the resonant cavity 112 may be formed by arranging a through hole on the resonator 110.

In this case, a metal plate may be arranged on a bottom surface of the resonator 110 as a metal material used to seal the closed end.

Alternatively, the radio frequency chip in this disclosure needs to be arranged on the PCB when being used.

Figure 12:
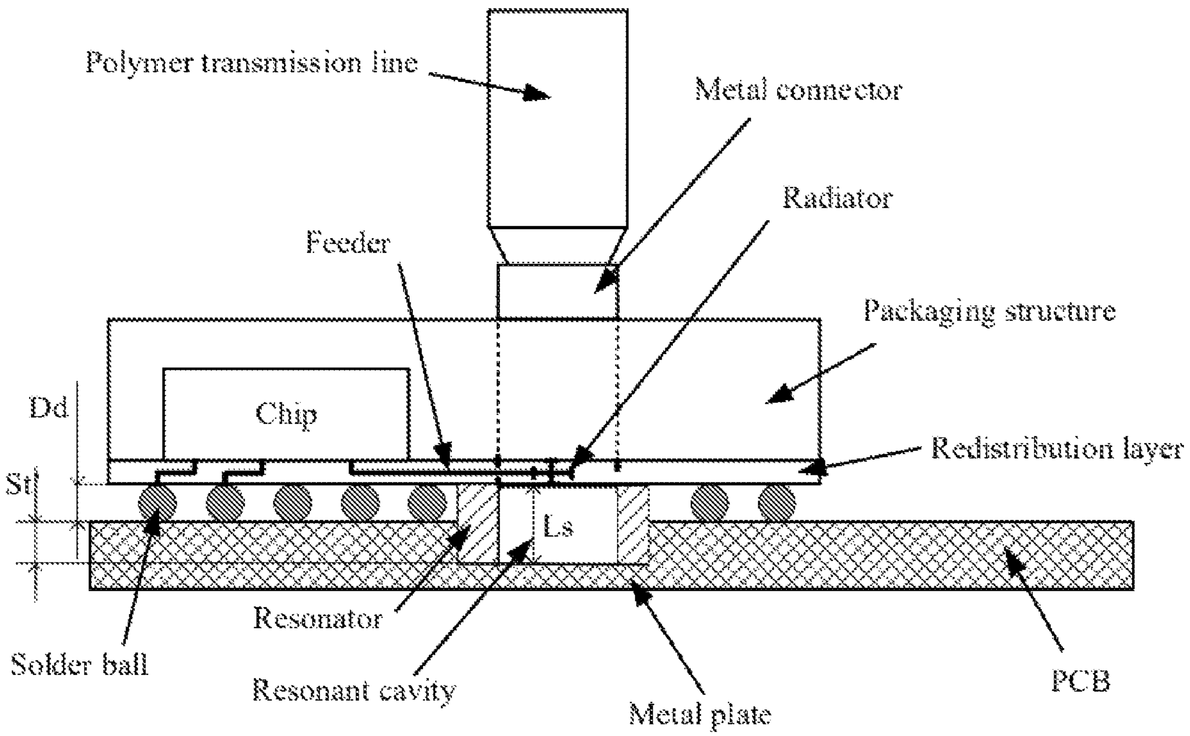
FIG. 12 is a schematic diagram of another example of an arrangement manner of a radio frequency chip on a PCB according to this disclosure.

For example, as shown in FIG. 12, a groove for accommodating the resonator 110 may be arranged on the PCB, and a metal material is covered on a bottom surface of the groove (for example, in a manner of electroplating, vapor deposition, or sputtering), so that when the radio frequency chip is arranged on the PCB, the resonator 110 is accommodated in the groove of the PCB. Therefore, the closed end can be sealed by using the metal material covering the bottom surface of the groove.

Figure 11:
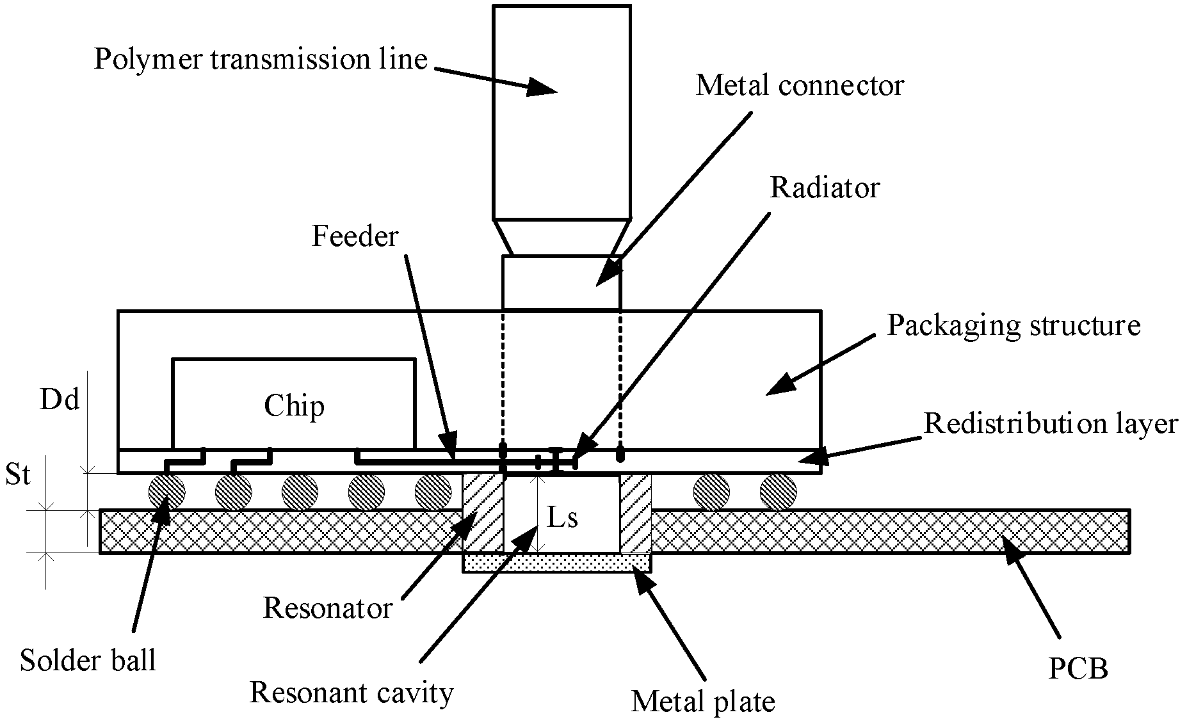
FIG. 11 is a schematic diagram of an example of an arrangement manner of a radio frequency chip on a PCB according to this disclosure.

For another example, as shown in FIG. 11, a through hole for accommodating the resonator 110 may be arranged on the PCB, and a metal plate is arranged at a position that is on a bottom surface of the PCB and that is corresponding to the through hole. Therefore, when the radio frequency chip is arranged on the PCB, the resonator 110 is accommodated in the groove of the PCB, so that the closed end can be sealed by using the metal plate.

Figure 5:
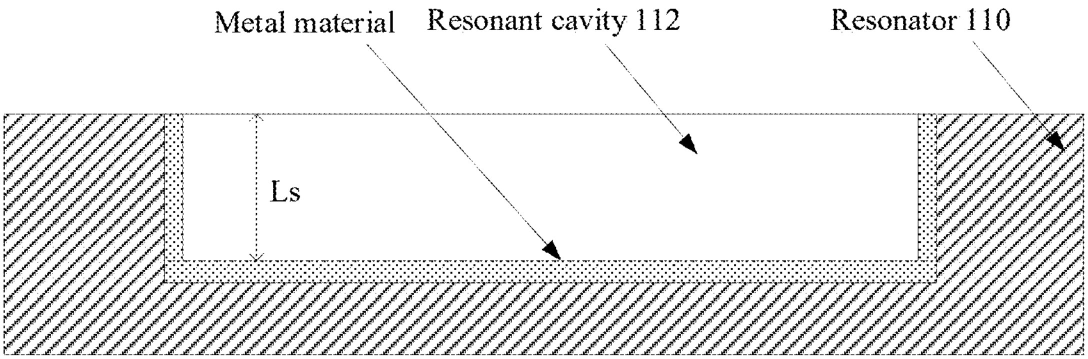
FIG. 5 is a schematic diagram of another example of a resonator according to this disclosure.

FIG. 5 is an example sectional view of another example of a structure of the resonator 110 according to this disclosure. As shown in FIG. 5, the resonant cavity 112 may be formed by arranging a groove on the resonator 110. In this case, the bottom surface of the groove may be covered with a metal material (for example, in a manner of electroplating, vapor deposition, or sputtering).

The groove 114 is arranged on one side wall of the resonator 110, and is configured to connect an outer wall of the resonator 110 and a side wall of the resonant cavity 112. In this disclosure, a width of the groove 114 is not particularly limited in this disclosure, provided that the feeder 140 described below can pass through.

As shown in FIG. 2 and FIG. 4, the groove 114 may be formed as a groove that penetrates the top surface and the bottom surface of the resonator 110.

Alternatively, as shown in FIG. 5, the groove 114 may be formed as a groove that penetrates neither the top surface nor the bottom surface of the resonator 110.

In this disclosure, a material of the resonator 110 may be a waveguide material, for example, lithium niobate (LiNbO3), an III-V semiconductor compound, silicon dioxide (SiO2), silicon-on-insulator (Silicon-on-Insulator, SOI), a polymer (Polymer), or glass.

That is, the resonator 110 may be a waveguide (or an optical waveguide).

Figure 3:
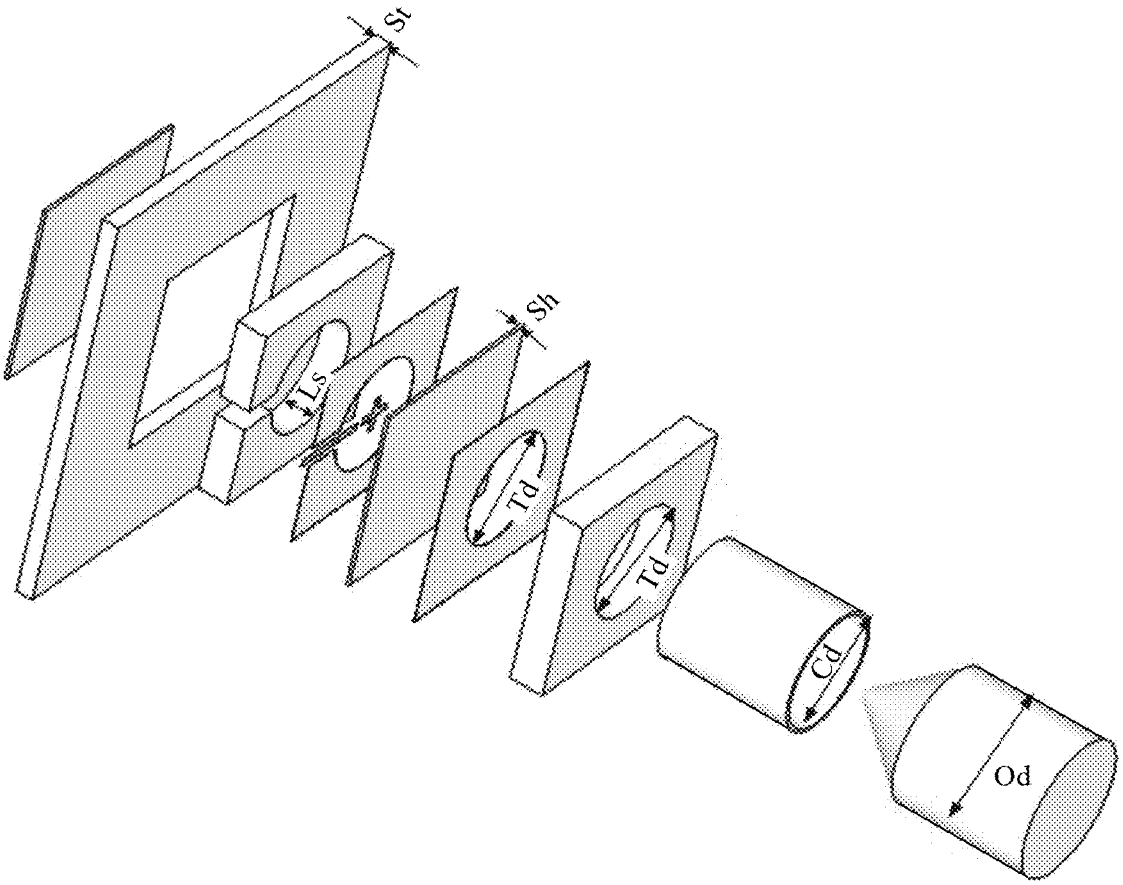
FIG. 3 is a dimension diagram of components of a radio frequency chip according to this disclosure.

FIG. 3 is a dimension diagram of components of a radio frequency chip according to this disclosure. As shown in FIG. 3, a diameter of the resonant cavity 112 is Ld, a diameter of the metal connector is Cd, and a depth of the resonant cavity 112 is Ls.

In this case, the relationship between Ld and Cd meets: Ld is the same as or approximately the same as Cd, that is, a deviation between Ld and Cd is within a preset range (which can be set according to a specific disclosure scenario or disclosure requirement), that is:

$Ld=Cd$, or $Ld\approx Cd$.

In addition, there is a correspondence between an operating frequency f of the resonator 110 (or an optical waveguide formed by the resonator 110) and a cross-sectional diameter Cd of the metal connector. For example, the correspondence may include but is not limited to:

$f \geq 1.841c/2\times\pi\times Cd$, where c represents the speed of light.

In addition, the depth Ls of the resonant cavity 112 needs to meet a quarter-wavelength resonance condition, that is, a deviation between Ls and $0.25\times\lambda d$ is within a preset range (which can be set according to a specific disclosure scenario or disclosure requirement), where λd is a wavelength of the electromagnetic signal. That is, $Ls=\lambda d$, or $Ls\approx\lambda d$.

B. Redistribution Layer (Redistribution Layer, RDL) 120

Redistribution may also be referred to as pad redistribution, indicating that leads of the chip needs to be redistributed to increase lead spacing and meet requirements of a flip chip bonding process.

As shown in FIG. 2, the RDL 120 includes an RDL bottom metal layer 122, an RDL dielectric layer 124, and an RDL top metal layer 126 that are arranged through stacking.

The RDL bottom metal layer 122 and the RDL top metal layer 126 are made of metal.

The RDL bottom metal layer 122 is arranged on the top surface 1102 of the resonator 110 (that is, on an open end surface of the resonator 110 on which the resonant cavity 112 is arranged.)

The RDL dielectric layer 124 is located between the RDL bottom metal layer 122 and the RDL top metal layer 126. By way of example and not limitation, a material of the RDL dielectric layer 124 may be, for example, polyetheretherketone.

It should be understood that the foregoing listed material of the RDL dielectric layer 124 is merely an example for description, and the material of the RDL dielectric layer 124 may also be the same as a material used in the conventional technology.

A through hole is formed on the RDL bottom metal layer 122, and a shape of the through hole is corresponding to a shape of the resonant cavity 112 (or a shape of the metal connector). For example, the through hole is formed as a circle. In addition, a size of the through hole is corresponding to (for example, the same as or approximately the same as) a size of the resonant cavity 112 (or a size of the metal connector). For example, a diameter of the through hole is Ld. In addition, a circle center of the through hole and a circle center of the resonant cavity 112 (specifically, a cross section of the resonant cavity 112) are coaxially arranged.

In addition, an opening for connecting the through hole of the RDL bottom metal layer 122 and the outer wall of the RDL bottom metal layer 122 is arranged on one side wall of the RDL bottom metal layer 122. A width of the opening is not particularly limited in this disclosure, provided that the feeder 140 described below can pass through.

Similarly, a through hole is formed on the RDL top metal layer 126, and a shape of the through hole is corresponding to the shape of the resonant cavity 112 (or the shape of the metal connector). For example, the through hole is formed as a circle. In addition, a size of the through hole is corresponding to (for example, the same as or approximately the same as) a size of the resonant cavity 112 (or a size of the metal connector). In addition, a circle center of the through hole and a circle center of the resonant cavity 112 (specifically, a cross section of the resonant cavity 112) are coaxially arranged.

C. Radiator 130

The radiator 130 is made of metal and is formed into a centro-symmetric shape, and specifically includes a plurality of resonance arms, where the plurality of resonance arms are symmetrically arranged with respect to a symmetry center. For example, as shown in FIG. 2 and FIG. 6, the radiator 130 may be formed into a "cross" shape.

As shown in FIG. 2, the radiator 130 is on a surface that is of the RDL dielectric layer 124 and that faces the RDL bottom metal layer 122.

A symmetry center of the radiator 130 and a symmetry center of the resonant cavity 112 (in other words, a symmetry center of the metal connector) are coaxially arranged. That is, the radiator 130 is located within a range of the through hole of the RDL bottom metal layer 122. That is, the radiator 130 is located within a range of the resonant cavity 112.

Figure 6:
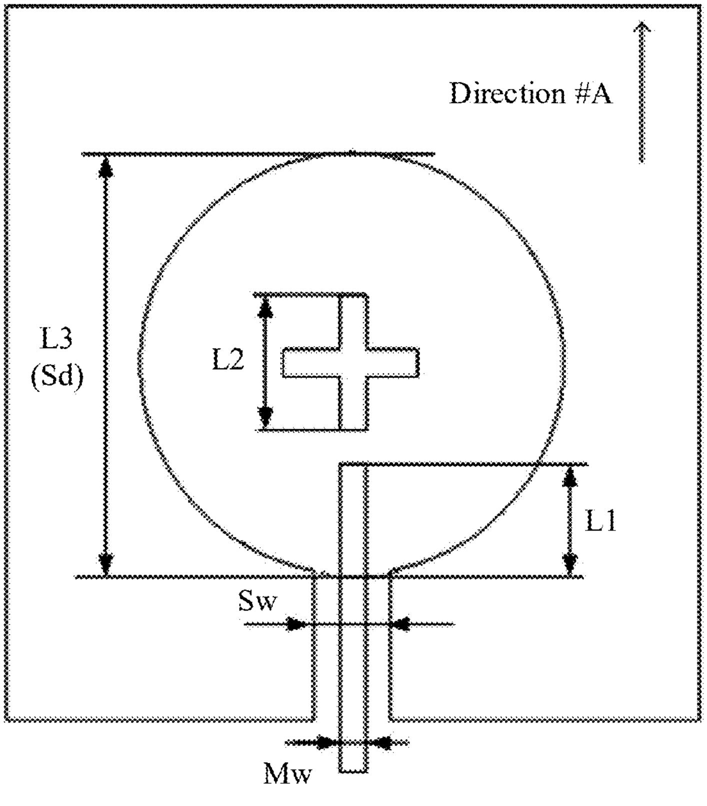
FIG. 6 is a schematic diagram of an example of a radiator according to this disclosure.

It should be understood that the foregoing listed structure of the radiator 130 shown in FIG. 2 and FIG. 6 is merely an example for description, and this disclosure is not limited thereto.

Figure 7:
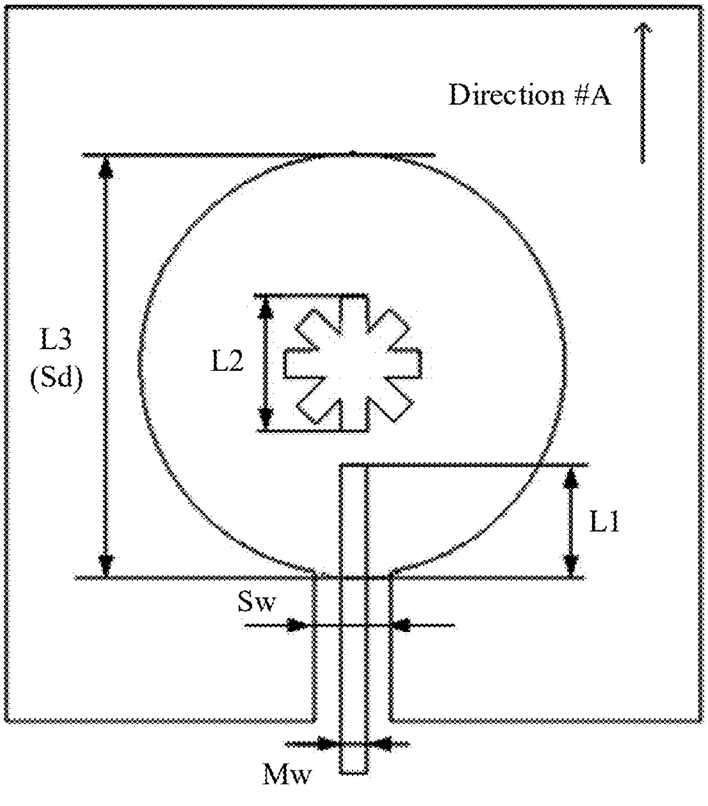
FIG. 7 is a schematic diagram of another example of a structure of a radiator according to this disclosure.

For example, as shown in FIG. 7, the radiator 130 may alternatively be formed into a “double-X” shape.

Figure 8:
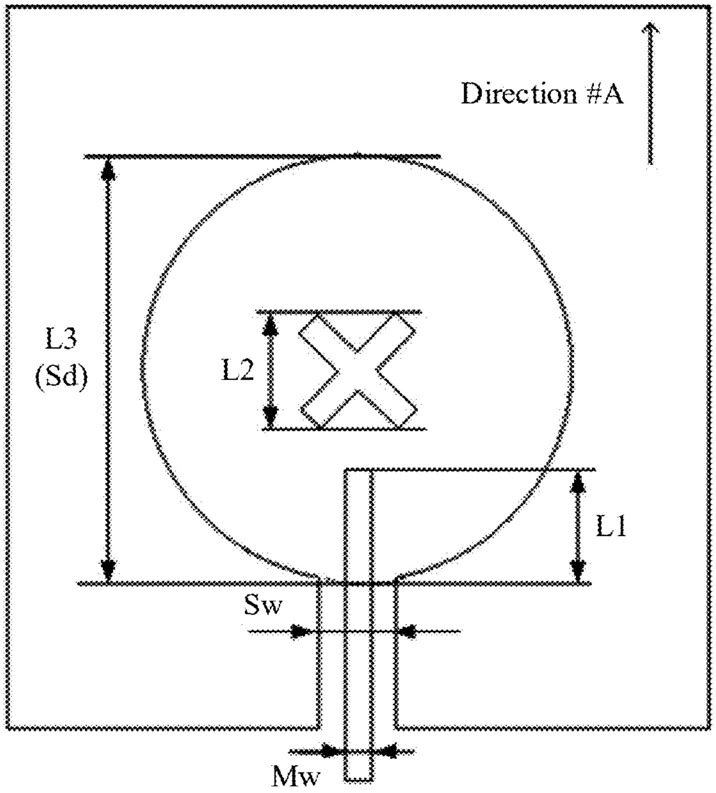
FIG. 8 is a schematic diagram of still another example of a structure of a radiator according to this disclosure.

For example, as shown in FIG. 8, the radiator 130 may alternatively be formed into a “X” shape.

Figure 9:
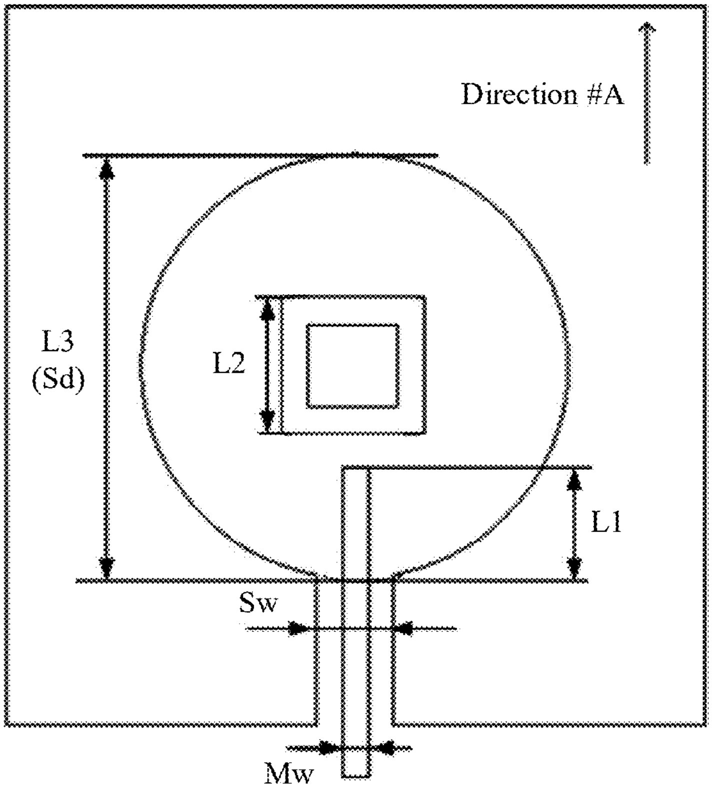
FIG. 9 is a schematic diagram of still another example of a structure of a radiator according to this disclosure.

For example, as shown in FIG. 9, the radiator 130 may alternatively be formed into a “rectangular ring shaped” shape.

Figure 10:
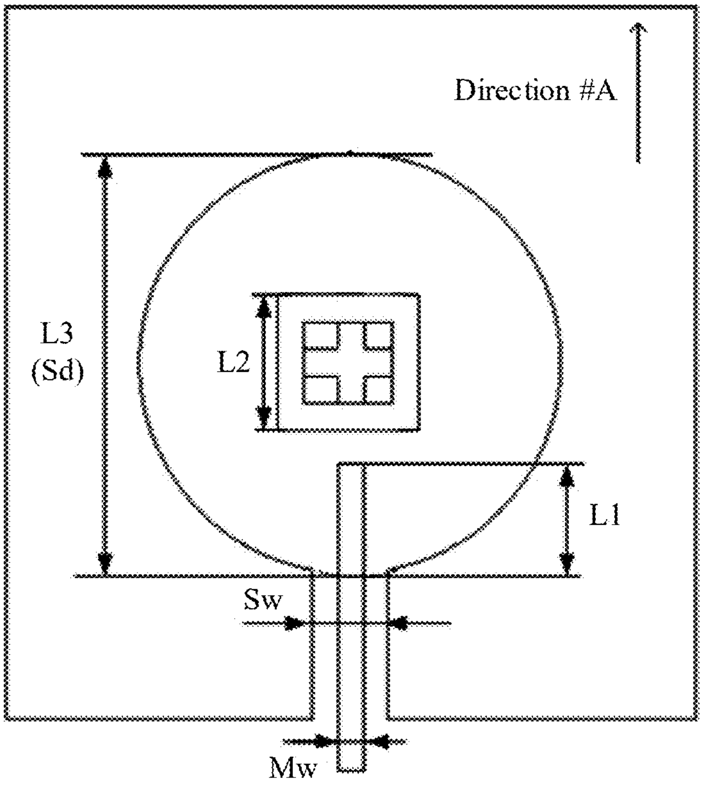
FIG. 10 is a schematic diagram of still another example of a structure of a radiator according to this disclosure.

For example, as shown in FIG. 10, the radiator 130 may alternatively be formed into a “2×2 grid” shape.

D. Feeder 140

The feeder 140 is arranged in the groove 114 (and the opening of the RDL bottom metal layer 122), or the feeder 140 passes through the space of the groove 114. Therefore, one end of the feeder 140 is inserted into the resonant cavity 112.

In addition, the other end of the feeder 140 is connected to the chip 200, so that the feeder 140 can transmit an electromagnetic signal between the chip 200 and the coupling structure 100.

The following describes dimensions of the feeder 140.

FIG. 6 to FIG. 10 show an arrangement relationship between the radiator 130, the feeder 140, and the resonant cavity 112. As shown in FIG. 6 to FIG. 10, it is assumed that the feeder 140 is inserted into the resonant cavity 112 along a direction #A, or that the groove 114 is arranged along the direction #A. In addition, it is assumed that a length of a part that is of the feeder 140 and that is inserted into the resonant cavity 112 is L1, a length of the radiator 130 in the direction #A is L2, and a length of the resonant cavity 112 (or a diameter of the resonant cavity) in the direction #A is L3.

To reduce the reflection coefficient, L1, L2, and L3 may meet the following relationship:

$L1+0.5\times L2<0.5\times L3$.

It should be understood that the foregoing listed relationship between L1, L2, and L3 is merely an example for description, and this disclosure is not limited thereto. A person skilled in the art may randomly set or change L1, L2, and L3 according to an actual requirement, provided that it is ensured that the signal quality of the electromagnetic signal transmitted between the chip 200 and the coupling structure 100 meets the use requirements.

FIG. 11 shows an example of an arrangement relationship between a PCB, a radio frequency chip, and a metal connector. As shown in FIG. 11, a through hole for accommodating the resonator 110 is formed on the PCB, and a metal plate is arranged at a bottom of the through hole, where the metal plate is configured to seal the bottom of the resonant cavity 112. A depth Ls of the resonant cavity 112, a height Dd of the solder ball on the PCB, and a thickness St of the PCB meet the following requirement:

$Ls\geq Dd+St$.

FIG. 12 shows an example of an arrangement relationship between a PCB, a radio frequency chip, and a metal connector. As shown in FIG. 12, a groove for accommodating the resonator 110 is formed on the PCB, and a metal layer is formed at a bottom of the groove, where the metal layer is configured to seal the bottom of the resonant cavity 112. A depth Ls of the resonant cavity 112, a height Dd of the solder ball on the PCB, and a depth thickness St' of the groove on the PCB meet:

$Ls\geq Dd+St'$.

By way of example and not limitation, in a possible implementation, the polymer transmission cable is of a solid core structure, a material is selected as polytetrafluoroethylene, a relative permittivity er of the polymer transmission cable on a D band is 2.1, and a loss angle tangent Df is 0.0002. The polymer transmission cable has a diameter Od of 2 mm, and the polymer transmission cable is inserted into a metal connector through a tapered gradient structure. A diameter Cd of the metal connector is 1.65 mm, and a diameter Td of the through hole 310 for accommodating the metal connector that is formed on the packaging structure 300 (or a diameter of the resonant cavity 112) is 1.65 mm. A thickness of the RDL top metal layer is 0.007 mm, a thickness Sh of the RDL intermediate dielectric layer is 0.05 mm, a thickness of the RDL bottom metal layer is 0.007 mm, a material of the RDL intermediate dielectric layer is polyetheretherketone, a relative permittivity er of the RDL intermediate dielectric layer is 3.2, and a loss angle tangent Df is 0.004. A width Mw of the feeder 140=0.1 mm, a width Sw of the groove 114=0.3 mm, and a length L1 of a part that is of the feeder 140 and that extends into the resonant cavity 112 is 0.42 mm. The radiator 130 is formed as a cross patch in a cross shape, an arm length L2 of the cross patch is 0.53 mm, and an arm width Ct of the cross patch is 0.1 mm. The depth Ls of the resonant cavity 112 is 0.45 mm. The PCB material is Rogers5800, and the thickness St of the PCB is 0.254 mm.

Figure 13:
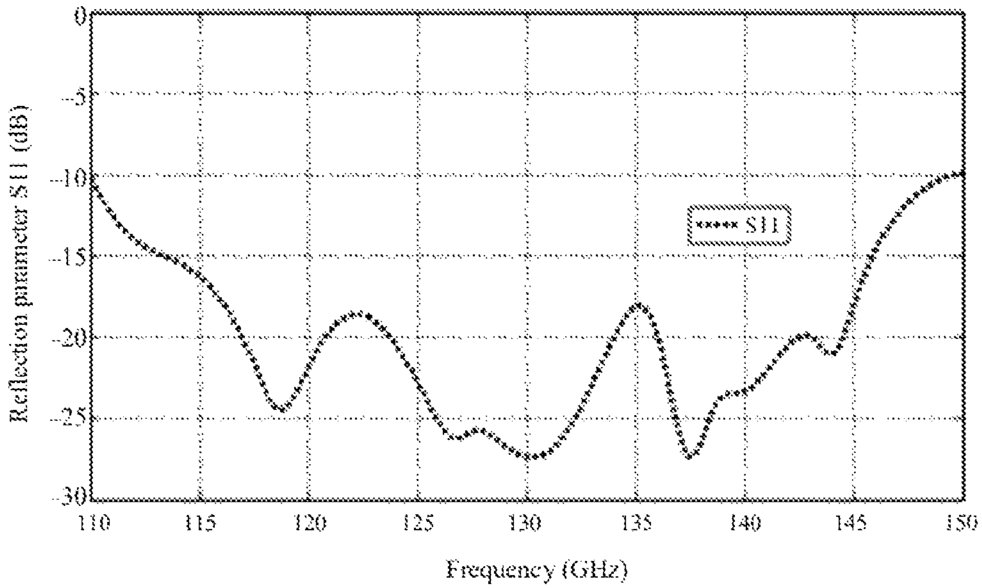
FIG. 13 is a schematic diagram of a relationship between a reflection parameter and a frequency of a radio frequency chip according to this disclosure.
Figure 14:
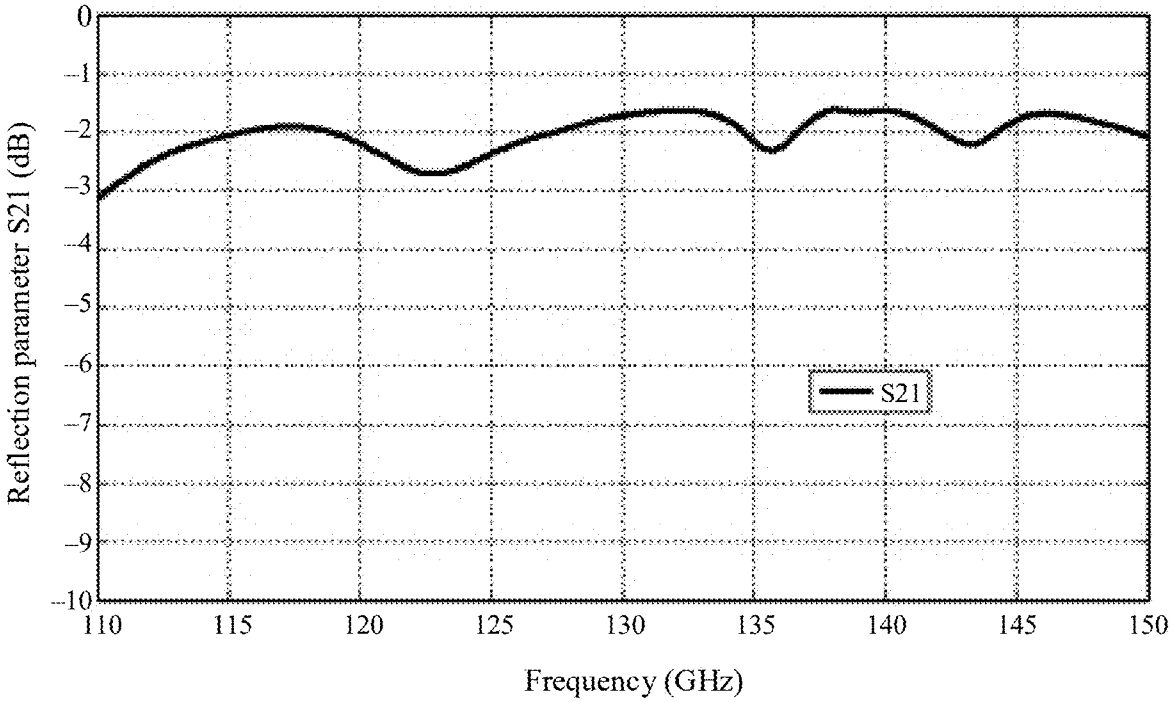
FIG. 14 is a schematic diagram of a relationship between transmission energy and a frequency of a radio frequency chip according to this disclosure.

FIG. 13 is a schematic diagram of a relationship between a reflection parameter and a frequency of a radio frequency chip according to this disclosure; and FIG. 14 is a schematic diagram of a relationship between transmission energy and a frequency of a radio frequency chip according to this disclosure. In an electromagnetic simulation experiment, electromagnetic simulation calculation is performed based on the foregoing structural dimensions. An S parameter on the D band (D-band) of this coupling structure solution may be obtained, as shown in FIG. 13 and FIG. 14. It can be learned from the calculation result that, on a frequency band of 110-150 GHz, the reflection parameter S11 is less than −10 dB, and the transmission parameter S21 is greater than −3.05 dB. This indicates that the solution in this disclosure has good electromagnetic transmission performance, and a good electromagnetic coupling effect can be implemented.

Figure 15:
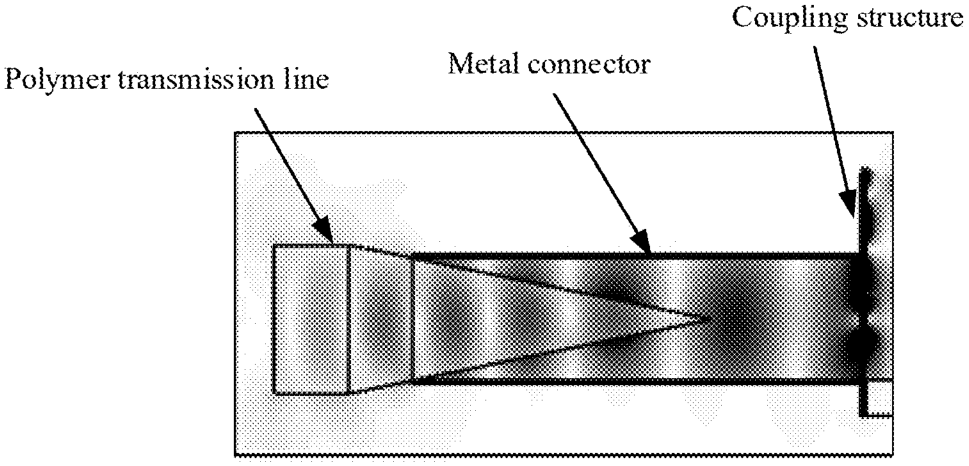
FIG. 15 is a schematic diagram of electric field distribution of a coupling structure according to this disclosure.

FIG. 15 is a schematic diagram of electric field distribution of a coupling structure according to this disclosure. An electric field distribution simulation experiment is performed based on the foregoing structural dimensions, and a calculation result is shown in FIG. 15. It can be learned from FIG. 15 that, a high-frequency signal is coupled to the feed microstrip line on the redistribution layer by using through-silicon vias on the radio frequency chip, and the transmission mode is quasi-TEM mode; the radiator 130 (that is, a metal cross patch antenna) and the resonant cavity 112 convert the quasi-TEM mode into a TE11 mode; and then the metal connector converts the TE11 mode into an HE11 mode.

That is, according to the solution provided in this disclosure, a centro-symmetric radiator is designed at the redistribution layer of the chip, and a through hole for embedding the metal connector is arranged on the packaging structure of the chip, so that a signal generated by the chip can be efficiently coupled to the polymer transmission line.

Because the foregoing structure is packaged in the chip, an insertion loss generated due to a connection line arranged between the chip and the coupling structure can be reduced, thereby improving coupling efficiency; and integration between the chip and the coupling structure can be improved, thereby facilitating large-scale processing.

Figure 16:
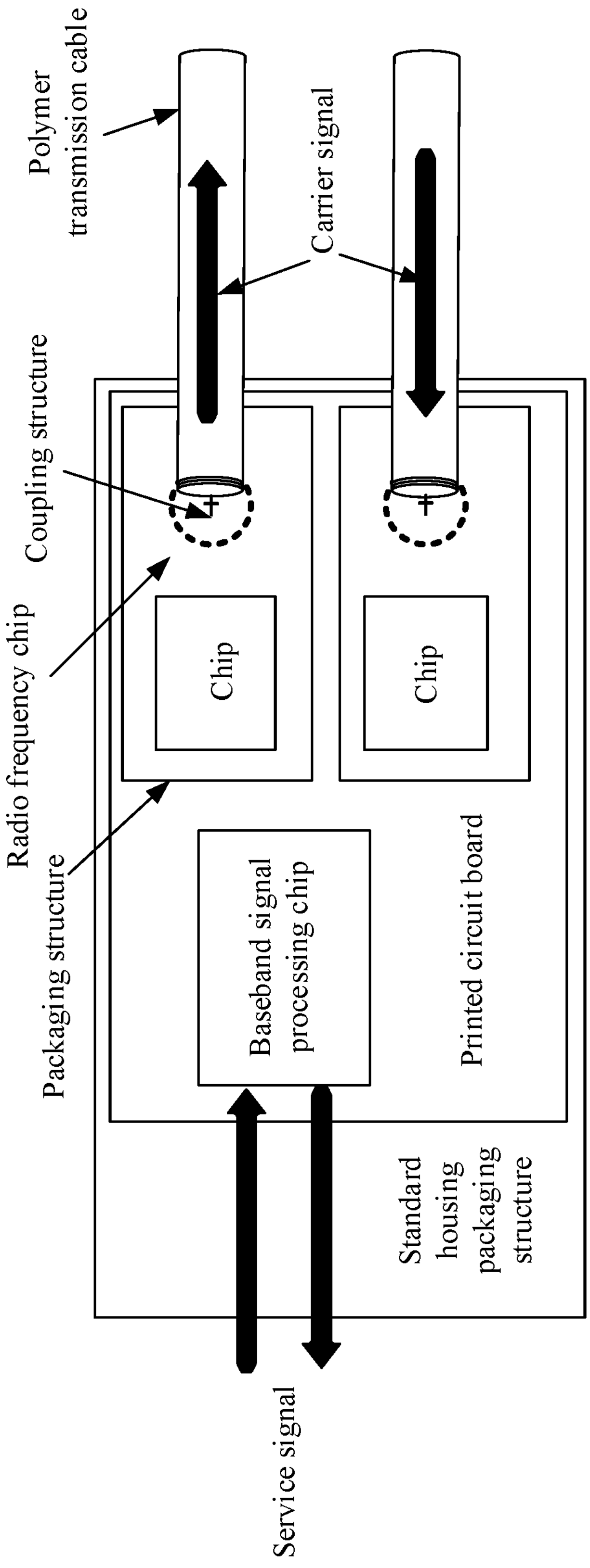
FIG. 16 is a schematic diagram of an example of a signal transceiver to which a radio frequency chip according to this disclosure is applicable.

FIG. 16 is a schematic diagram of an example of a signal transceiver to which a radio frequency chip according to this disclosure is applicable. As shown in FIG. 16, the signal transceiver includes a plurality of radio frequency chips, and at least one of the plurality of radio frequency chips has the structure of the radio frequency chip shown in any one of FIG. 1 to FIG. 12. Herein, to avoid repetition, detailed descriptions are omitted. In addition, when the signal transceiver includes a plurality of radio frequency chips according to this disclosure, structures of the plurality of radio frequency chips may be the same or may be different. This is not particularly limited in this disclosure.

Figure 17:
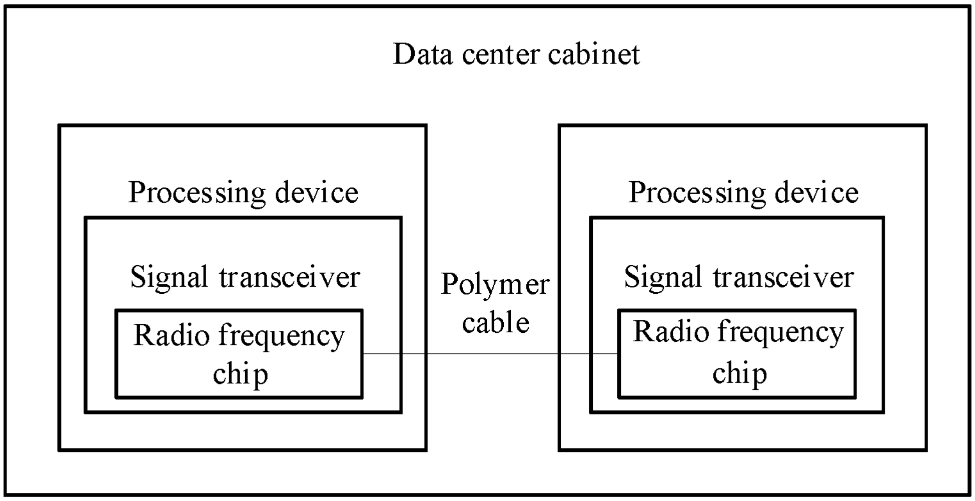
FIG. 17 is a schematic diagram of a structure of an example of a data center cabinet to which a radio frequency chip according to this disclosure is applicable.

FIG. 17 is a schematic diagram of a structure of an example of a data center cabinet to which a radio frequency chip according to this disclosure is applicable. As shown in FIG. 17, the data center cabinet includes a plurality of processing devices (for example, boards); each processing device includes one or more signal transceivers; each signal transceiver includes a plurality of radio frequency chips; and at least one radio frequency chip in the plurality of radio frequency chips has the structure of the radio frequency chip shown in any one of FIG. 1 to FIG. 12. Herein, to avoid repetition, detailed descriptions are omitted. In addition, when the signal transceiver includes a plurality of radio frequency chips according to this disclosure, structures of the plurality of radio frequency chips may be the same or may be different. This is not particularly limited in this disclosure.

Figure 18:
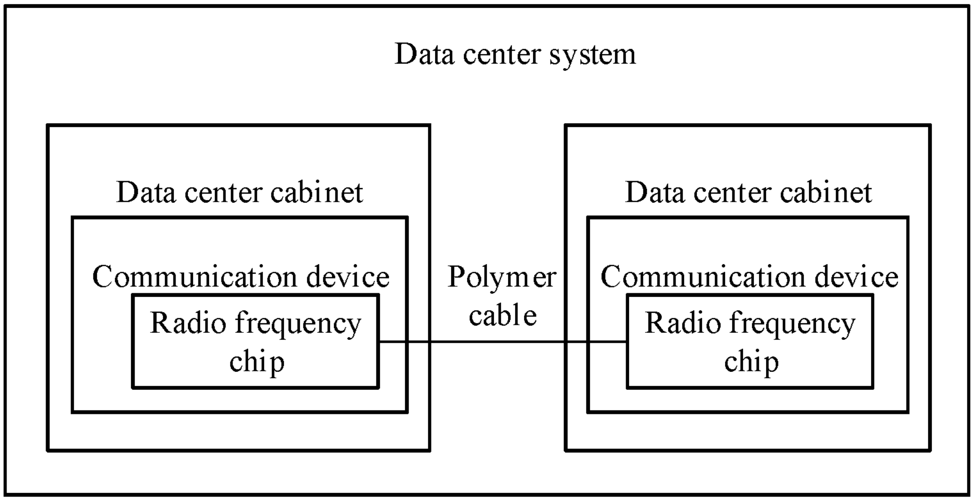
FIG. 18 is a schematic diagram of a structure of an example of a data center system to which a radio frequency chip according to this disclosure is applicable.

FIG. 18 is a schematic diagram of a structure of an example of a data center system to which a radio frequency chip according to this disclosure is applicable. As shown in FIG. 18, the data center system includes a plurality of data center cabinets; each data center cabinet includes one or more communication devices or signal transceivers configured to communicate with other data center cabinets; each signal transceiver includes a plurality of radio frequency chips; and at least one radio frequency chip in the plurality of radio frequency chips has the structure of the radio frequency chip shown in any one of FIG. 1 to FIG. 12. Herein, to avoid repetition, detailed descriptions are omitted. In addition, when the signal transceiver includes a plurality of radio frequency chips according to this disclosure, structures of the plurality of radio frequency chips may be the same or may be different. This is not particularly limited in this disclosure.

In the several embodiments provided in this disclosure, it should be understood that the disclosed system and apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, in other words, may be located in one position, or may be distributed on a plurality of units. Some or all of the units may be selected based on actual requirements to achieve the objectives of the solutions of embodiments.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A radio frequency chip, comprising:

a chip (200), that is configured to generate an electromagnetic signal or process an electromagnetic signal;

a coupling structure (100), that comprises:

a resonator (110) having a resonant cavity (112) and a groove (114), wherein an inner wall of the resonant cavity (112) is made of metal, one end of the resonant cavity (112) is opened on a top surface (1102) of the resonator (110), the other end of the resonant cavity is sealed by using a metal material, a cross section of the resonant cavity (112) is formed into a centro-symmetric shape, and the groove (114) connects an outer wall of the resonator (110) and an inner wall of the resonant cavity (112);

a redistribution layer (RDL) (120), arranged above the top surface (1102) and comprising an RDL dielectric layer (124);

a radiator (130), made of metal, formed into a centro-symmetric shape, arranged on a surface that is of the RDL dielectric layer (124) and that faces the resonator (110), and accommodated in the resonant cavity (112); and a feeder (140), accommodated in the groove (114), wherein one end of the feeder (140) is connected to the chip (200), and the other end of the feeder (140) is inserted into the resonant cavity (112); and a packaging structure (300), that is configured to package the chip (200) and cover the RDL (120), wherein a through hole (310) for accommodating the metal connector is formed on the packaging structure (300), one end of the metal connector is in contact with a surface that is of the RDL (120) and that faces away from the resonator (110), the other end of the metal connector is configured to connect to a polymer transmission cable, and a cross section of the through hole (310) is formed into a centro-symmetric shape;

wherein a symmetry center of the radiator (130), a symmetry center of the resonant cavity (112), and a symmetry center of the through hole (310) are coaxially arranged, and a deviation between cross-sectional sizes of the through hole (310) and the resonant cavity (112) is within a first preset range.

2. The radio frequency chip according to claim 1, wherein a deviation between a depth of the resonant cavity (112) and a first value is within a second preset range, and the first value is a quarter of a wavelength of the electromagnetic signal.

3. The radio frequency chip according to claim 2, the feeder (140) having a first part inserted into the resonant cavity (112) in a first direction, wherein:

a length L1 of the first part is determined based on a length L2 of the radiator (130) in the first direction and a length L3 of the resonant cavity (112) in the first direction;

L2 is determined based on L1 and L3; or

L3 is determined based on L1 and L2.

4. The radio frequency chip according to claim 3, wherein the length L1, the length L2, and the length L3 meet the following relationship:

$L1+0.5\times L2<0.5\times L3$.

5. The radio frequency chip according to claim 1, wherein the resonator (100) is made of a waveguide material, and an operating frequency f of the waveguide material corresponds to a cross-sectional diameter D1 of the metal connector.

6. The radio frequency chip according to claim 3, wherein the operating frequency f and the cross-sectional diameter D1 meet the following relationship:

$f\geq 1.841c/(2\times\pi\times D1)$ wherein c represents the speed of light.

7. The radio frequency chip according to claim 1, wherein a depth of the resonant cavity (112) is greater than or equal to a sum of a second value and a third value, wherein the second value is a depth of a recessed structure that is in a printed circuit board (PCB) and that is configured to accommodate the coupling structure (100), and the second value is a height of a solder ball in the PCB.

8. The radio frequency chip according to claim 1, wherein a cross section of the resonant cavity (112) and a cross section of the metal connector are circular, and a deviation between a diameter of the resonant cavity and a diameter of the metal connector is within a third preset range.

9. The radio frequency chip according to claim 1, wherein the radiator (130) is formed into one of a cross structure, a double-X-shaped structure, an X-shaped structure, a rectangular ring shaped structure, or a 2×2 grid structure.

10. A signal transceiver, comprising:

a radio frequency chip; and a printed circuit board (PCB), provided with a recessed structure for accommodating the radio frequency chip;

with the radio frequency chip comprising:

a chip (200), that is configured to generate an electromagnetic signal or process an electromagnetic signal;

a coupling structure (100), that comprises:

a resonator (110) having a resonant cavity (112) and a groove (114), wherein an inner wall of the resonant cavity (112) is made of metal, one end of the resonant cavity (112) is opened on a top surface (1102) of the resonator (110), the other end of the resonant cavity is sealed by using a metal material, a cross section of the resonant cavity (112) is formed into a centro-symmetric shape, and the groove (114) connects an outer wall of the resonator (110) and an inner wall of the resonant cavity (112);

a redistribution layer (RDL) (120), arranged above the top surface (1102) and comprising an RDL dielectric layer (124);

a radiator (130), made of metal, formed into a centro-symmetric shape, arranged on a surface that is of the RDL dielectric layer (124) and that faces the resonator (110), and accommodated in the resonant cavity (112); and a feeder (140), accommodated in the groove (114), wherein one end of the feeder (140) is connected to the chip (200), and the other end of the feeder (140) is inserted into the resonant cavity (112); and a packaging structure (300), that is configured to package the chip (200) and cover the RDL (120), wherein a through hole (310) for accommodating the metal connector is formed on the packaging structure (300), one end of the metal connector is in contact with a surface that is of the RDL (120) and that faces away from the resonator (110), the other end of the metal connector is configured to connect to a polymer transmission cable, and a cross section of the through hole (310) is formed into a centro-symmetric shape; wherein a symmetry center of the radiator (130), a symmetry center of the resonant cavity (112), and a symmetry center of the through hole (310) are coaxially arranged, and a deviation between cross-sectional sizes of the through hole (310) and the resonant cavity (112) is within a first preset range.

11. The signal transceiver according to claim 10, wherein the recessed structure is a through hole or a groove.

12. The signal transceiver according to claim 10, wherein a deviation between a depth of the resonant cavity (112) and a first value is within a second preset range, and the first value is a quarter of a wavelength of the electromagnetic signal.

13. The signal transceiver according to claim 12, the feeder (140) having a first part inserted into the resonant cavity (112) in a first direction; wherein:

a length L1 of the first part is determined based on a length L2 of the radiator (130) in the first direction and a length L3 of the resonant cavity (112) in the first direction;

L2 is determined based on L1 and L3; or

L3 is determined based on L1 and L2.

14. The signal transceiver according to claim 13, wherein the length L1, the length L2, and the length L3 meet the following relationship:

$L1+0.5\times L2<0.5\times L3$.

15. The signal transceiver according to claim 10, wherein the resonator (100) is made of a waveguide material, and an operating frequency f of the waveguide material corresponds to a cross-sectional diameter D1 of the metal connector.

16. The signal transceiver according to claim 12, wherein the operating frequency f and the cross-sectional diameter D1 meet the following relationship:

$f\geq 1.841c/(2\times\pi\times D1)$ wherein c represents the speed of light.

17. The signal transceiver according to claim 10, wherein a depth of the resonant cavity (112) is greater than or equal to a sum of a second value and a third value, wherein the second value is a depth of a recessed structure that is in a printed circuit board (PCB) and that is configured to accommodate the coupling structure (100), and the second value is a height of a solder ball in the PCB.

18. The signal transceiver according to claim 10, wherein a cross section of the resonant cavity (112) and a cross section of the metal connector are circular, and a deviation between a diameter of the resonant cavity and a diameter of the metal connector is within a third preset range.

19. The signal transceiver according to claim 10, wherein the radiator (130) is formed into one of a cross structure, a double-X-shaped structure, an X-shaped structure, a rectangular ring shaped structure, or a 2×2 grid structure.

20. A communication device, comprising:

a signal transceiver, wherein signal transceiver comprising:

a radio frequency chip; and a printed circuit board PCB, provided with a recessed structure for accommodating the radio frequency chip;

with the radio frequency chip comprising:

a chip (200), that is configured to generate an electromagnetic signal or process an electromagnetic signal; and a coupling structure (100), that comprises:

a resonator (110), wherein a resonant cavity (112) and a groove (114) are formed, an inner wall of the resonant cavity (112) is made of metal, one end of the resonant cavity (112) is opened on a top surface (1102) of the resonator (110), the other end of the resonant cavity is sealed by using a metal material, a cross section of the resonant cavity (112) is formed into a centro-symmetric shape, and the groove (114) connects an outer wall of the resonator (110) and an inner wall of the resonant cavity (112);

a redistribution layer (RDL) (120), arranged above the top surface (1102) and comprising an RDL dielectric layer (124);

a radiator (130), made of metal, formed into a centro-symmetric shape, arranged on a surface that is of the RDL dielectric layer (124) and that faces the resonator (110), and accommodated in the resonant cavity (112); and a feeder (140), accommodated in the groove (114), wherein one end is connected to the chip (200), and the other end is inserted into the resonant cavity (112); and a packaging structure (300), that is configured to package the chip (200) and cover the RDL (120), wherein a through hole (310) for accommodating the metal connector is formed on the packaging structure (300), one end of the metal connector is in contact with a surface that is of the RDL (120) and that faces away from the resonator (110), the other end of the metal connector is configured to connect to a polymer transmission cable, and a cross section of the through hole (310) is formed into a centro-symmetric shape;

wherein a symmetry center of the radiator (130), a symmetry center of the resonant cavity (112), and a symmetry center of the through hole (310) are coaxially arranged, and a deviation between cross-sectional sizes of the through hole (310) and the resonant cavity (112) is within a first preset range.

* * * * *